(12) United States Patent
Botts

(10) Patent No.: US 9,045,980 B1
(45) Date of Patent: Jun. 2, 2015

(54) DOWNHOLE GAS AND SOLIDS SEPARATOR

(71) Applicant: Troy Botts, Snyder, TX (US)

(72) Inventor: Troy Botts, Snyder, TX (US)

( * ) Notice: Subject to any disclaimer, the term of this patent is extended or adjusted under 35 U.S.C. 154(b) by 0 days.

(21) Appl. No.: 14/481,064

(22) Filed: Sep. 9, 2014

Related U.S. Application Data

(60) Provisional application No. 61/963,213, filed on Nov. 25, 2013.

(51) Int. Cl.
*E21B 43/38* (2006.01)
*E21B 43/34* (2006.01)

(52) U.S. Cl.
CPC ................ *E21B 43/38* (2013.01); *E21B 43/34* (2013.01)

(58) Field of Classification Search
CPC ......... E21B 43/38; E21B 21/06; E21B 27/04; E21B 43/34; E21B 43/36
USPC ................ 166/105.1, 105.3, 105.5, 265, 357; 96/208, 216, 195, 220
See application file for complete search history.

(56) References Cited

U.S. PATENT DOCUMENTS

| | | | |
|---|---|---|---|
| 1,863,111 A * | 6/1932 | Greve | 96/216 |
| 2,757,582 A * | 8/1956 | Boadway et al. | 209/17 |
| 4,666,476 A * | 5/1987 | Reeve et al. | 96/216 |
| 5,431,228 A | 7/1995 | Weingarten et al. | |
| 5,525,146 A * | 6/1996 | Straub | 96/214 |
| 5,531,811 A * | 7/1996 | Kloberdanz | 95/261 |
| 5,861,052 A * | 1/1999 | Meinander | 95/243 |
| 6,036,749 A * | 3/2000 | Ribeiro et al. | 95/261 |
| 6,039,116 A * | 3/2000 | Stevenson et al. | 166/263 |
| 6,494,258 B1 | 12/2002 | Weingarten | |
| 6,723,158 B2 * | 4/2004 | Brown et al. | 96/214 |
| 6,860,921 B2 * | 3/2005 | Hopper | 95/261 |
| 7,543,633 B2 | 6/2009 | Brown et al. | |
| 8,136,600 B2 * | 3/2012 | Fowler et al. | 166/357 |
| 8,651,184 B2 | 2/2014 | Raglin | |
| 2003/0079882 A1* | 5/2003 | Mack et al. | 166/369 |
| 2003/0145990 A1* | 8/2003 | Longacre | 166/265 |
| 2005/0241826 A1* | 11/2005 | Pratt | 166/265 |
| 2011/0048696 A1* | 3/2011 | Holte | 166/105.5 |
| 2013/0032341 A1 | 2/2013 | Raglin | |

* cited by examiner

*Primary Examiner* — Daniel P Stephenson
(74) *Attorney, Agent, or Firm* — Sarah Hegi Simpson; McWhorter, Cobb & Johnson, LLP

(57) ABSTRACT

The disclosed downhole gas and solids separator includes a suspended helical flighting member for efficient downhole separation of both gases and solids from a hydrocarbon production stream. Centrifugal force, provided by the flighting member, accelerates the coalescence of like materials to enhance separation of both gases and solids within the separator. Centrifugal force urges solids to the outer wall of the separator and gases toward the center, where passageways are designed to allow solids to efficiently migrate toward and accumulate at the bottom of the separator while simultaneously allowing gases to efficiently rise out of the separator device.

19 Claims, 5 Drawing Sheets

DOWNHOLE GAS AND SOLIDS SEPARATOR

CROSS-REFERENCE TO RELATED APPLICATIONS

This application is related to and claims priority from earlier filed U.S. Provisional Patent Application No. 61/963,213, filed Nov. 25, 2013, the disclosure of which is incorporated herein by reference.

BACKGROUND OF THE INVENTION

1. Field of the Invention

The present invention relates generally to a downhole gas and solids separator. More specifically, the present invention relates to a device which employs centrifugal force for the downhole separation of gas and solids from a hydrocarbon production stream.

2. Description of Related Art

Artificial lift systems, such as sucker rod pumping systems and progressing cavity pumping systems, are an artificial means employed to increase the flow of fluids (e.g., hydrocarbons) from a production well. Artificial lift is needed in wells when there is insufficient pressure in the reservoir to lift the produced fluids to the surface. Additionally, artificial lift is often used in naturally flowing wells to increase the flow rate above the natural flow rate.

Artificial lift systems often require the attachment of a gas separator at the pump intake. In many wells that produce hydrocarbons, the production stream can include both liquid and gaseous products that are a natural byproduct of the producing well. As hydrocarbons and water flow through the formation, gases can travel in the production stream either separate from the liquid products or entrained within the liquid products. The gas entrained within the liquid products is carried into the production tubing and can cause problems with artificial lift systems by reducing the volumetric efficiency of the pump. The function of a gas separator is to remove as much of the gas as possible from the liquid products coming from the reservoir. Avoiding the entrance of gas is a key factor in maintaining optimum pump efficiency and extending the life of artificial lift systems.

Additionally, artificial lift systems often require the use of a solids or sand separator. In many wells that produce hydrocarbons, the production stream further includes manmade or natural solid products. The most common manmade solid found at the wellhead is proppant or fracture sand, which is increasingly being used as more and more wells are being hydraulically fractured to increase the production of the wells. Additionally, the production stream may include solids (e.g., sand, silt, etc.) that are a natural byproduct of the producing well. As hydrocarbons and water flow through the formation, these solid products are carried in the production stream and can cause problems with the artificial lift system, such as reducing the life of the lift system and increasing maintenance costs.

Currently, many different separator devices are available for separating gaseous products or solid products from produced fluids. Design problems in current devices, however, present several disadvantages that are overcome by the present invention.

Most current devices are either gas separators or solid separators. Such separators are unable to simultaneously separate both gases and solids from the production stream. Current devices that claim to separate both gases and solids from produced fluids comprise multiple sections or phases—one section or phase for separating solid products and another section or phase for separating gaseous products from the produced fluids. Therefore, such devices inefficiently separate gas and solids in separate phases, not simultaneously.

Currently, a need exists for a downhole gas and solids separator that simultaneously separates gases and solids from a hydrocarbon production stream. A separator device is needed that prevents both gaseous products and solid products from entering pumps and reducing the efficiency of pumps. Further, a device is needed that reduces the need to repair or replace downhole assembly parts, thereby reducing costs.

In view of the foregoing, it is apparent that a need exists in the art for a gas and solids separator which overcomes, mitigates or solves the above problems in the art. It is a purpose of this invention to fulfill this and other needs in the art which will become more apparent to the skilled artisan once given the following disclosure.

OBJECTS AND SUMMARY OF THE INVENTION

It is an object of the present invention to overcome the above described drawbacks associated with current devices. To achieve these and other advantages and in accordance with the purpose of the invention, as embodied and broadly described, the present disclosure describes a downhole gas and solids separator which employs centrifugal force for the downhole separation of gases and solids from a hydrocarbon production stream.

In all production, gases, sand and other solids enter the wellbore and create pumping inefficiencies that severely diminish production and contribute to increased maintenance costs and unnecessary failures. The disclosed device is a simple, effective separator that uses centrifugal force and a suspended internal fighting member for effective downhole separation of both gases and solids from production fluid. The disclosed device allows clean and gas-free production fluid to fill the pump intake permitting greater production and pump efficiency.

The disclosed separator device generally comprises a housing member; an inner tube member having a first end and a second end, the inner tube member being at least partially disposed within the housing member; an annular zone formed between an interior surface of the housing member and an exterior surface of the inner tube member; a flighting support member attached to said second end of said inner tube member; a flighting member having a first end and a second end, said flighting member being disposed within said annular zone between said housing member and said inner tube member, wherein said second end of said flighting member engages said flighting support member in a manner which suspends said flighting member around a portion of said inner tube member; an inner annular space defined as the void space formed between the inside diameter of said flighting member and the exterior surface of said inner tube member; and an outer annular space defined as the void space extending from the outside diameter of the flighting member to the interior surface of the housing member. By utilizing a suspended helical flighting member, the disclosed device is able to provide for the efficient and effective simultaneous separation of both gases and solids from production fluid.

The unique and novel configuration of the disclosed separator device provides many advantages over current separator devices. Unlike existing separator devices, the primary advantage of the disclosed device is that it provides for the simultaneous separation of both gases and solids from a hydrocarbon production stream. The disclosed device employs a suspended helical flighting member for effective downhole separation of both gases and solids from production fluid. Centrifugal force, provided by the flighting member, accelerates the coalescence of like materials to enhance separation of both gases and solids within the separator. Centrifugal force urges solids to the outer wall of the separator and gases towards the center where passageways (i.e., void annular spaces) are designed to allow solids to efficiently migrate towards and accumulate at the bottom of the separator, while simultaneously allowing gases to efficiently rise out of the separator device.

In this manner, the disclosed device effectively cleans production fluid and prevents gaseous products and solid products from entering a pump and reducing the efficiency of the pump. By moving less gaseous products and solid products through the artificial lift system, oil and gas operators will benefit from greater pump efficiency and extended run time between failures, and the operators will thereby increase their profit margin.

A further advantage provided by the disclosed device is that in one embodiment of the disclosed invention, the device comprises components which all have threaded connections to provide for easy disassembly, inspection, repair or replacement, and reassembly of each of the components of the device. In comparison, current separators are typically made of components which are welded together and thus the entire separator device must be disposed of when any component of the separator is damaged.

These, together with other objects of the invention, along with various features of novelty that characterize the invention, are pointed out with particularity in the claims annexed hereto and forming a part of this disclosure. For a better understanding of the invention, its operating advantages, and the specific objects attained by its uses, reference should be had to the accompanying drawings and descriptive matter in which there is described illustrative embodiments of the invention.

BRIEF DESCRIPTION OF THE DRAWINGS

The accompanying drawings, which are incorporated in and form a part of the specification, illustrate embodiments of the present invention, and together with the description, serve to explain the principles of the invention. It is to be expressly understood that the drawings are for the purpose of illustration and description only and are not intended as a definition of the limits of the invention. In the drawings.

DETAILED DESCRIPTION OF ILLUSTRATIVE EMBODIMENTS

Figure 1:
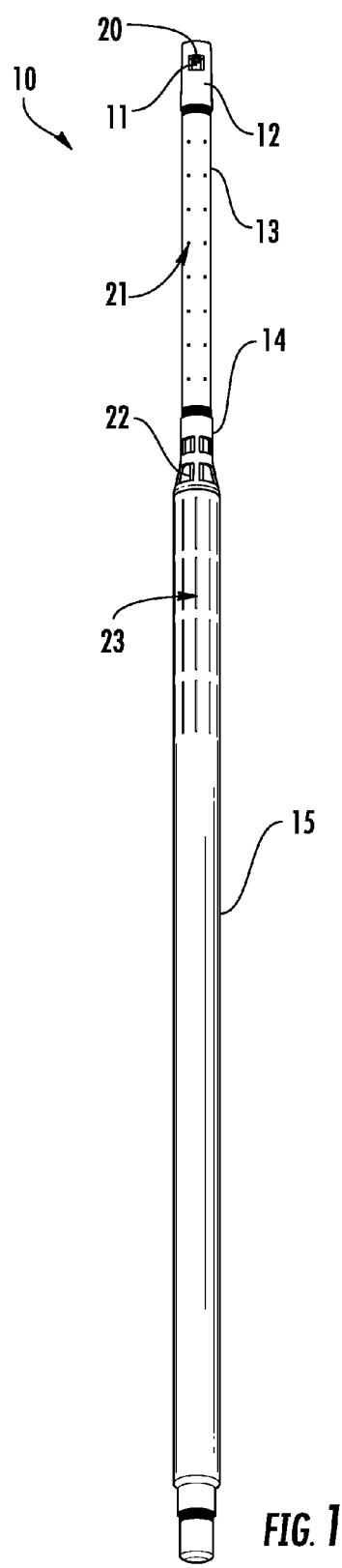
FIG. 1 is a perspective view of a separator device constructed in accordance with the teachings of the present disclosure.

The terms "top," "bottom," and "upper" are used in the specification to describe the embodiments of the invention as illustrated in the accompanying Figures. It should be appreciated that in actual use, an embodiment of the invention may be rotated as needed to accomplish the objectives of the invention. As a result of such rotation, the various terms used herein of "top," "bottom," "upper" and the like may not literally apply to a particular arrangement. Such terms are relative and are used herein to describe the Figures for illustration purposes only and are not intended to limit the embodiments shown to any particular orientation.

Referring now to FIGS. 1-5, exemplary embodiments of a gas and solids separator device 10 in accordance with the present disclosure are illustrated. The separator device 10 according to the present disclosure is illustrated and generally includes a housing member 15; an inner tube member 11 having a first end 33 and a second end 34, the inner tube member 11 being at least partially disposed within the housing member 15; an annular zone 25 formed between an interior surface 32 of the housing member 15 and an exterior surface 31 of the inner tube member 11; a flighting support member 17 attached to said second end 34 of said inner tube member 11; a flighting member 16 having a first end 35 and a second end 36, said flighting member 16 being disposed within said annular zone 25 between said housing member 15 and said inner tube member 11, wherein said second end 36 of said flighting member 16 engages said flighting support member 17 in a manner which suspends said flighting member 16 around a portion of said inner tube member 11; an inner annular space 26 defined as the void space formed between the inside diameter 29 of said flighting member 16 and the exterior surface 31 of said inner tube member 11; and an outer annular space 27 defined as the void space extending from the outside diameter 30 of the flighting member 16 to the interior surface 32 of the housing member 15.

As depicted in the attached Figures, the housing member 15 may include one or more openings 23 therein. The openings 23 in the housing member 15 are arranged and configured to allow the fluid production stream to enter the separator device 10 and flow into the annular zone 25. The annular zone 25 defines the area extending between the interior surface 32 of the housing member 15 and the exterior surface 31 of the inner tube member 11. In the embodiments illustrated in FIGS. 1 and 4, the openings 23 are configured as elongated narrow slots. This configuration of the openings 23 is designed to prevent large gas bubbles from entering the separator. Nevertheless, one skilled in the art can appreciate that there are many other possibilities that exist for the shape, configuration, positioning, and number of the openings 23, all of which are considered to be within the spirit and scope of the present invention.

Figure 4:
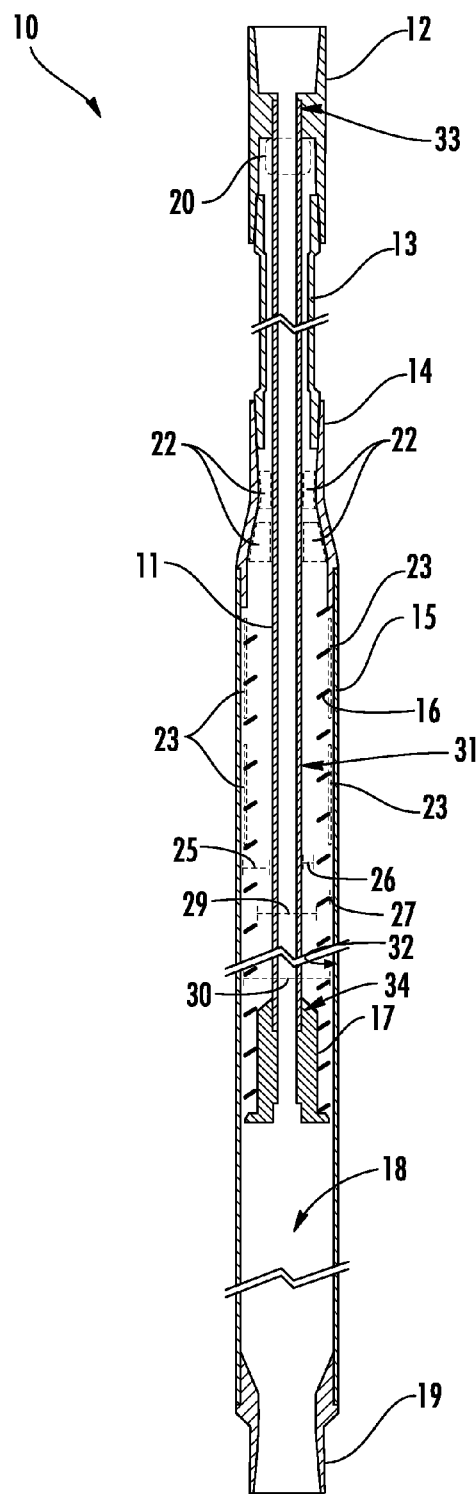
FIG. 4 is a sectional view showing the internal structure of a separator device constructed in accordance with the teachings of the present disclosure.
Figure 5:
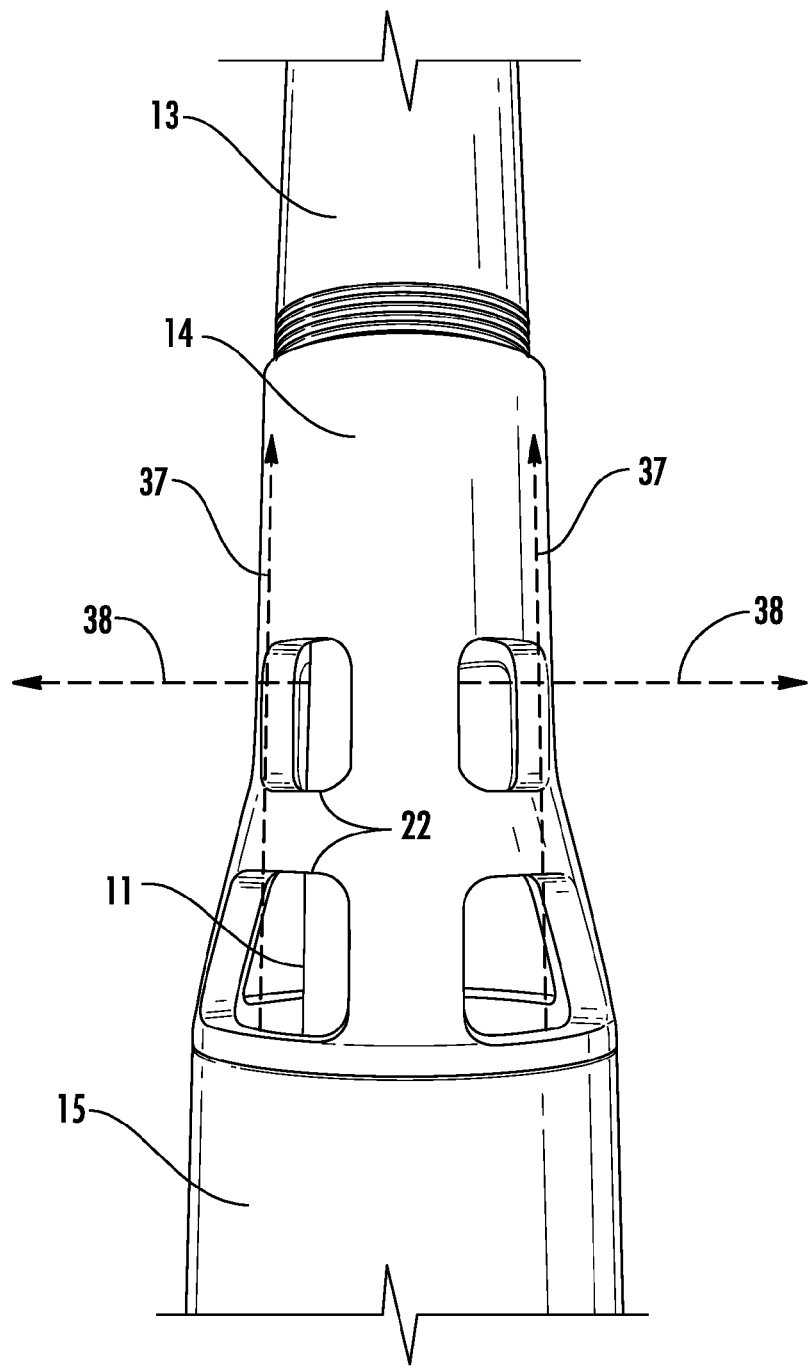
FIG. 5 is a perspective view of a gas discharge member constructed in accordance with the teachings of the present disclosure.

In the embodiments shown in FIGS. 1, 4 and 5, the housing member 15 is connected to a gas discharge member 14. The housing member 15 may be connected to the gas discharge member via a threaded connection or by any other connection means known to those skilled in the art. As shown in FIG. 5, the gas discharge member 14 is configured with one or more openings 22, which are arranged and configured to allow gas to exit the device 10 following a vertical pathway 37 and/or a horizontal pathway 38. The bottom portion of the gas discharge member 14 is the widest part of the gas discharge member 14. The bottom portion of the gas discharge member 14 tapers into a narrower top portion of said gas discharge member 14. As depicted in the accompanying Figures, one or more of the openings 22 are arranged such that gas bubbles floating vertically up the separator device 10 can easily exit the gas discharge member 14 via a vertical pathway 37. Additionally, the gas bubbles can exit the gas discharge member 14 via a horizontal pathway 38. In this embodiment, the gas discharge member 14 is configured to provide multiple unobstructed pathways for gas bubbles to easily exit the separator device 10. In comparison, current devices are configured to only allow gas bubbles to attempt to escape such separators via horizontal pathways. The disclosed device 10 is better able to get rid of gas bubbles by also providing one or more vertical pathways 37 for the gas bubbles to exit the device 10.

As illustrated in FIGS. 1 and 4, the gas discharge member 14 may be connected to a tube extension member 13. The gas discharge member 14 may be connected to the tube extension member 13 via a threaded connection or by any other connection means known to those skilled in the art. The tube extension member 13 may be perforated and include one or more openings 21 as shown in FIG. 1. Such openings 21 provide additional outlets for gaseous products to exit from the separator device 10 before reaching the artificial lift system.

Figure 2:
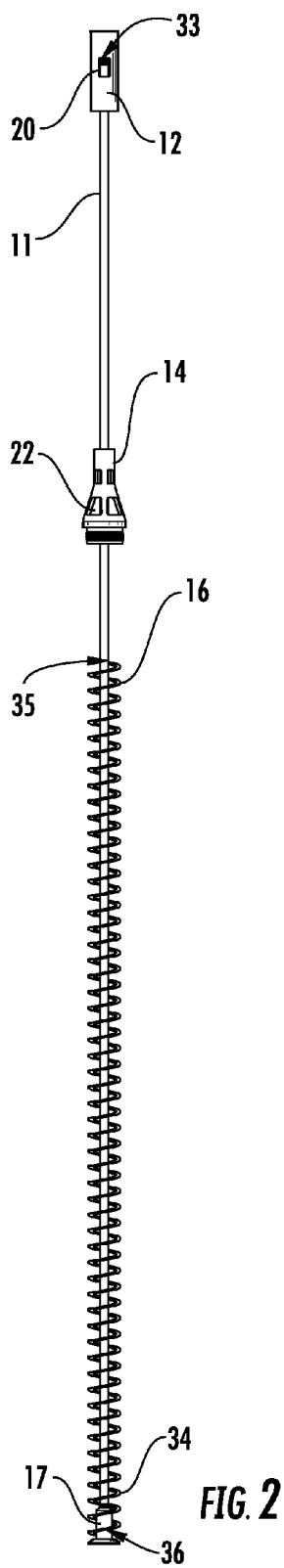
FIG. 2 is a perspective view showing the internal parts of the separator device shown in FIG. 1.

The disclosed separator device 10 may further include an inner tube coupling member 12 connected to the first end 33 of the inner tube, as depicted in FIGS. 1, 2, and 4. The inner tube coupling member 12 is also connected to the tube extension member 13. The inner tube coupling member 12 may be coupled to both the inner tube member 11 and the tube extension member 13 via threaded connections or any other connection means known to those skilled in the art. The inner tube coupling member 12 may further include one or more openings 20 configured to allow gaseous products to exit the separator device 10 before reaching the artificial lift system.

As shown in the accompanying Figures, the disclosed separator device 10 further includes an inner tube member 11. The inner tube member 11 includes a first end 33 connected to an inner tube coupling member 12, and a second end 34 connected to a flighting support member 17. The inner tube member 11 may be coupled to both the inner tube coupling member 12 and the flighting support member 17 via threaded connections or any other connection means known to those skilled in the art. In operation, the artificial lift system pulls fluid, after it has been separated from gases and solids, up through the inner tube member 11.

Figure 3:
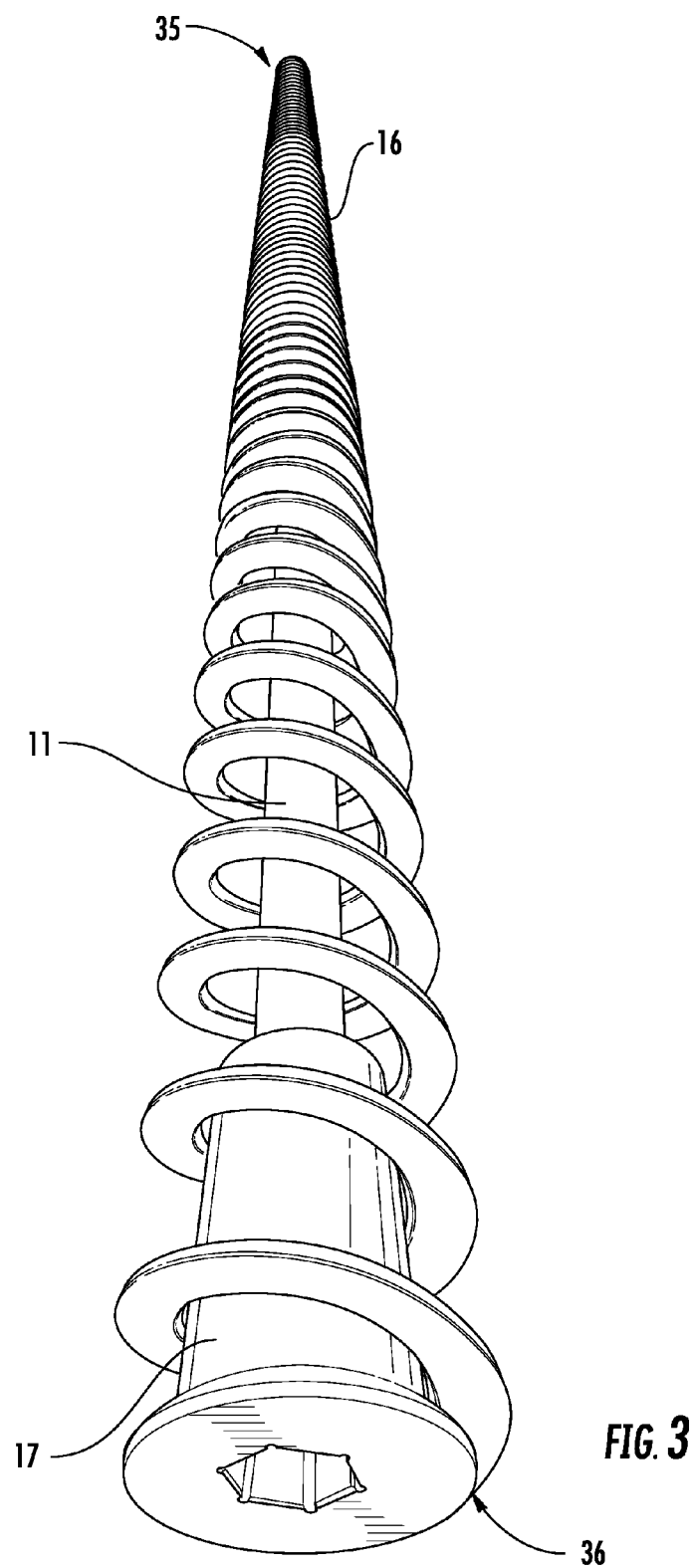
FIG. 3 is a bottom perspective view of a flighting member suspended around an inner tube member, wherein the flighting member is engaged with a flighting support member, and wherein said members are constructed in accordance with the teachings of the present disclosure.

The disclosed separator device 10 also includes a flighting member 16. In the embodiments shown in FIGS. 2-4, the flighting member 16 is a helical member which is suspended around the inner tube member 11. The flighting member 16 has a first end 35 and a second end 36. The second end 36 of the flighting member 16 is engaged with a flighting support member 17, which flighting support member 17 is connected to the second end 34 of the inner tube member 11. As shown in FIG. 3, the flighting member 16 is suspended around the inner tube member 11 in a manner in which the flighting member 16 is not directly attached to or engaged with the inner tube member 11. An inner annular space 26 separates the inside edges of the flighting member 16 and the exterior surface 31 of the inner tube member 11. This inner annular space 26 defines the void space between the inside diameter 29 of the flighting member 16 and the exterior surface 31 of the inner tube member 11.

As depicted in FIG. 4, the disclosed separator device 10 further includes an outer annular space 27 which separates the outermost edges of the flighting member 16 from the interior surface 32 of the housing member 15. The outer annular space 27 defines the void space extending from the outside diameter 30 of the flighting member 16 to the interior surface 32 of the housing member 15.

The disclosed separator device 10 may further include a solids accumulation area 18. The solids accumulation area 18 is located below the inner tube member 11, flighting member 16 and the flighting support member 17, as shown in FIG. 4.

The solids accumulation area 18 defines an empty chamber for receiving solid products separated from the production fluid by the disclosed separator device 10.

As can be seen in FIGS. 1 and 4, the disclosed separator device 10 may further include a plug member 19 connected to the bottom of the device 10. The plug member 19 is easily removable from the device 10 and can be removed from the device 10 to empty the accumulated solids from the solids accumulation area 18.

In operation, the disclosed separator device 10 may work as follows. The production stream is drawn into the one or more openings 23 in the housing member 15 by both the artificial lift system and gravity. Once the production stream enters through the openings 23 in the housing member 15, the production stream is drawn down the annular zone 25 between the housing member 15 and the inner tube member 11. When the production stream is drawn down the annular zone 25, it is being pulled down the helical path provided by the flighting member 16 suspended in the annular zone 25. Centrifugal force is generated when the production stream flows down the helical path provided by the flighting member 16. Centrifugal force forces the heavier components (i.e., the solids) in the production stream outwards toward the interior surface 32 of the housing member 15. The solid products eventually migrate down the outer annular space 27 until the solids are captured in a solids accumulation area 18 located below the second end 34 of the inner tube member 11. At the same time, the centrifugal force provided by the helical flighting member 16 forces the lighter components (i.e., the gases) in the production stream inwards toward the center of the device 10 against the exterior surface 31 of the inner tube member 11. Here, gas bubbles coalesce into larger gas bubbles and then rise through the void inner annular space 26 provided between the inside diameter 29 of the flighting member 16 and the exterior surface 31 of the inner tube member 11. The gas will continue to rise through the inner annular space 26 until it exits through an opening (e.g., an opening in the gas discharge member) formed in the upper portion of the disclosed separator, where the gas can easily exit into the well casing annulus and then continue rising to the surface of the well. Finally, the artificial lift system draws the production stream, which has been separated from gases and solids, back up the device 10 through the inner tube member 11 and into a pump. The pump (not depicted) is located above the separator device 10. In this manner, the disclosed device 10 effectively cleans production fluid and prevents gaseous products and solid products from entering the artificial lift system.

It is important to note that the construction and arrangement of the elements of the device provided herein are illustrative only. Although only a few exemplary embodiments of the present invention have been described in detail in this disclosure, those skilled in the art who review this disclosure will readily appreciate that many modifications are possible in these embodiments (such as variations in orientation of the components of the system, sizes, structures, shapes and proportions of the various components, etc.) without materially departing from the novel teachings and advantages of the invention.

Many other uses of the present invention will become obvious to one skilled in the art upon acquiring a thorough understanding of the present invention. Once given the above disclosures, many other features, modifications and variations will become apparent to the skilled artisan in view of the teachings set forth herein. Such other uses, features, modifications and variations are, therefore, considered to be a part of this invention, the scope of which is to be determined by the following claims.

The invention claimed is:

1. A separator device for use with a hydrocarbon production well producing a fluid production stream including gaseous products and solid products, said separator device comprising:
   a housing member;
   an inner tube member having a first end and a second end, said inner tube member being at least partially disposed within said housing member;
   an annular zone formed between an interior surface of said housing member and an exterior surface of said inner tube member;
   a flighting support member attached to said second end of said inner tube member;
   a flighting member having a first end and a second end, said flighting member being disposed within said annular zone between said housing member and said inner tube member, wherein said second end of said flighting member engages said flighting support member in a manner which suspends said flighting member around a portion of said inner tube member in a manner in which said flighting member remains detached from said inner tube member;
   an inner annular space defined as the void space formed between the inside diameter of said flighting member and the exterior surface of said inner tube member; and
   an outer annular space defined as the void space extending from the outside diameter of the flighting member to the interior surface of the housing member.

2. The device according to claim 1, wherein said housing member includes one or more openings therein, said openings in said housing member being arranged and configured to allow said fluid production stream to enter said separator device.

3. The device according to claim 2, wherein said one or more openings in said housing member are configured as elongated narrow slots configured to hinder said gaseous products from entering said device.

4. The device according to claim 1, further comprising a gas discharge member connected to said housing member, wherein said gas discharge member includes one or more openings arranged and configured to allow gas to exit said device.

5. The device according to claim 4, wherein said one or more openings in said gas discharge member are arranged and configured to allow gas to exit the device following a vertical pathway.

6. The device according to claim 5, wherein said one or more openings in said gas discharge member are arranged and configured to allow gas to exit the device following a horizontal pathway.

7. The device according to claim 4, wherein the bottom portion of said gas discharge member is the widest part of said gas discharge member and said bottom portion tapers into a narrower top portion of said gas discharge member.

8. The device according to claim 4, further including a tube extension member connected to said gas discharge member.

9. The device according to claim 8, wherein said tube extension member includes one or more openings arranged and configured to allow gas to exit the device.

10. The device according to claim 1, further comprising an inner tube coupling member connected to said first end of said inner tube member.

11. The device according to claim 10, wherein said inner tube coupling member includes one or more openings arranged and configured to allow gas to exit the device.

12. The device according to claim 1, wherein said flighting member defines a helical member suspended around said inner tube member.

13. The device according to claim 1, further including a solids accumulation area that defines an empty chamber for receiving said solid products separated from said production stream.

14. The device according to claim 1, wherein said flighting member is arranged and configured to generate centrifugal force to simultaneously urge said solid products toward said interior surface of said housing member and said gaseous products toward said exterior surface of said inner tube member.

15. The device according to claim 1, wherein said device is arranged and configured to generate centrifugal force to simultaneously urge said solid products into said outer annular space and said gaseous products into said inner annular space.

16. The device according to claim 1, wherein said flighting support member is attached to the bottommost portion of said second end of said inner tube member.

17. A separator device for use with a hydrocarbon production well producing a fluid production stream including gaseous products and solid products, said separator device comprising:
   a housing member;
   an inner tube member having a first end and a second end, said inner tube member being partially disposed within said housing member, wherein said second end of said inner tube member is disposed within said housing member and said first end of said inner tube member is disposed outside of said housing member;
   an annular zone formed between an interior surface of said housing member and an exterior surface of said inner tube member;
   a flighting support member attached to said second end of said inner tube member;
   a flighting member having a first end and a second end, said flighting member being disposed within said annular zone between said housing member and said inner tube member, wherein said second end of said flighting member engages said flighting support member in a manner which suspends said flighting member around a portion of said inner tube member;
   an inner annular space defined as the void space formed between the inside diameter of said flighting member and the exterior surface of said inner tube member; and
   an outer annular space defined as the void space extending from the outside diameter of the flighting member to the interior surface of the housing member.

18. A separator device for use with a hydrocarbon production well producing a fluid production stream including gaseous products and solid products, said separator device comprising:
   a housing member;
   an inner tube member having a first end and a second end, said inner tube member being at least partially disposed within said housing member, wherein said inner tube member is configured to pass fluids therethrough from said second end to said first end of said inner tube member;
   an annular zone formed between an interior surface of said housing member and an exterior surface of said inner tube member;
   a flighting support member attached to said second end of said inner tube member;

a flighting member having a first end and a second end, said flighting member being disposed within said annular zone between said housing member and said inner tube member, wherein said second end of said flighting member engages said flighting support member in a manner which suspends said flighting member around a portion of said inner tube member;

an inner annular space defined as the void space formed between the inside diameter of said flighting member and the exterior surface of said inner tube member; and an outer annular space defined as the void space extending from the outside diameter of the flighting member to the interior surface of the housing member.

19. A separator device for use with a hydrocarbon production well producing a fluid production stream including gaseous products and solid products, said separator device comprising:

a housing member;

an unperforated inner tube member having a first end and a second end, said inner tube member having a single opening at said first end and a single opening at said second end, wherein said inner tube member is at least partially disposed within said housing member;

an annular zone formed between an interior surface of said housing member and an exterior surface of said inner tube member;

a flighting support member attached to second end of said inner tube member;

a flighting member having a first end and a second end, said flighting member being disposed within said annular zone between said housing member and said inner tube member, wherein said second end of said flighting member engages said flighting support member in a manner which suspends said flighting member around a portion of said inner tube member;

an inner annular space defined as the void space formed between the inside diameter of said flighting member and the exterior surface of said inner tube member; and an outer annular space defined as the void space extending from the outside diameter of the flighting member to the interior surface of the housing member.

* * * * *